W. G. WAITT.
AUTOMATIC DRY CELL HAMMER.
APPLICATION FILED JUNE 19, 1913.
1,183,051.
Patented May 16, 1916.
4 SHEETS—SHEET 1.
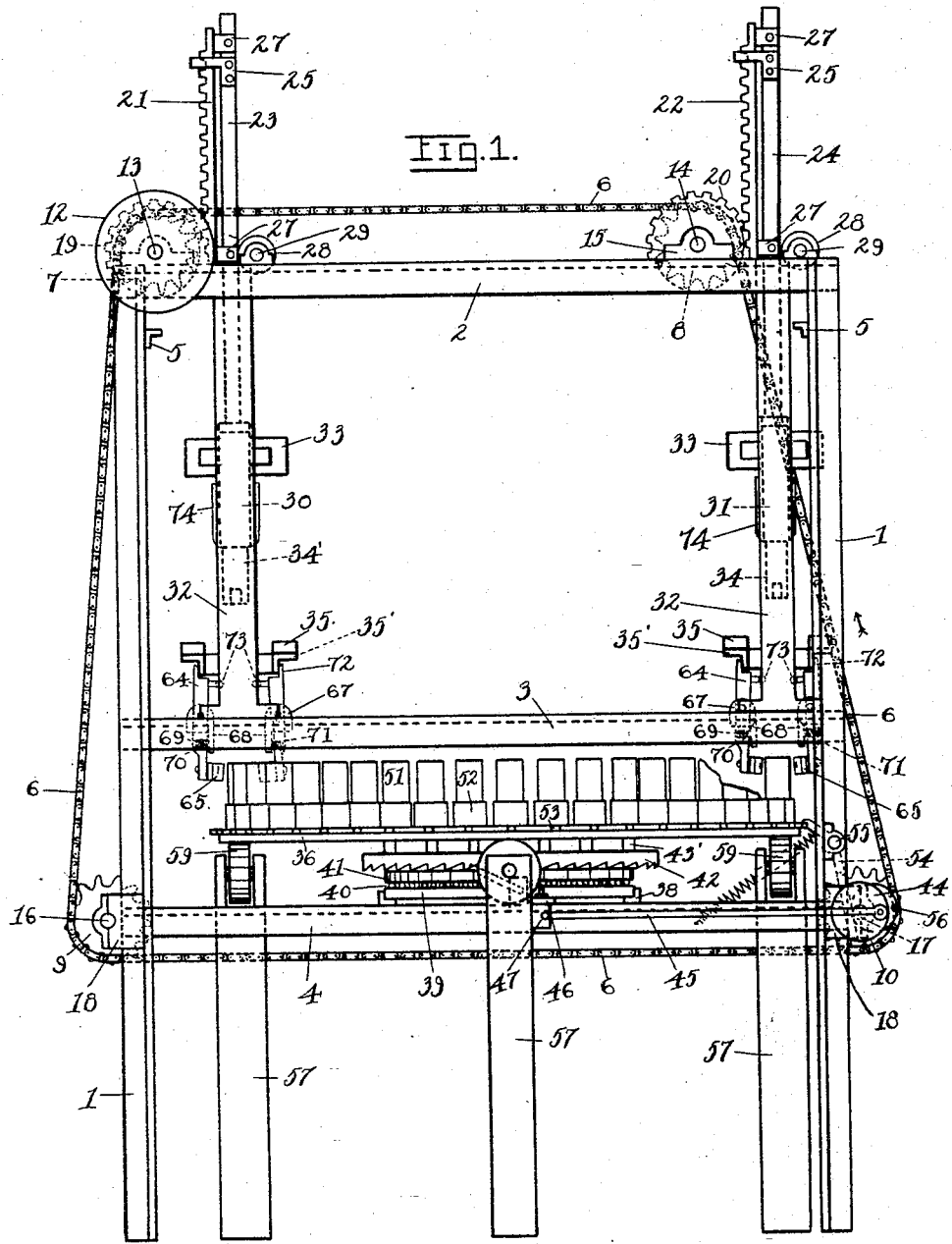
WITNESSES:
INVENTOR
WALTER G. WAITT
BY
ATTORNEY

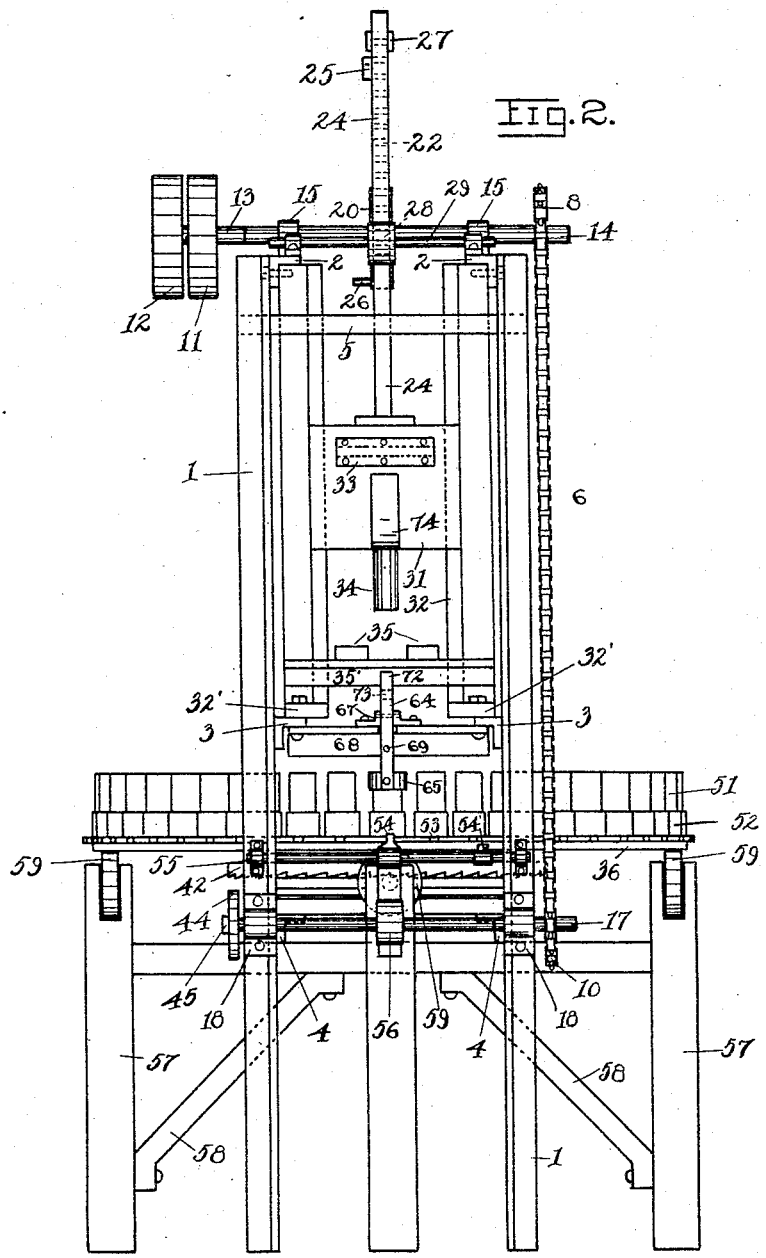

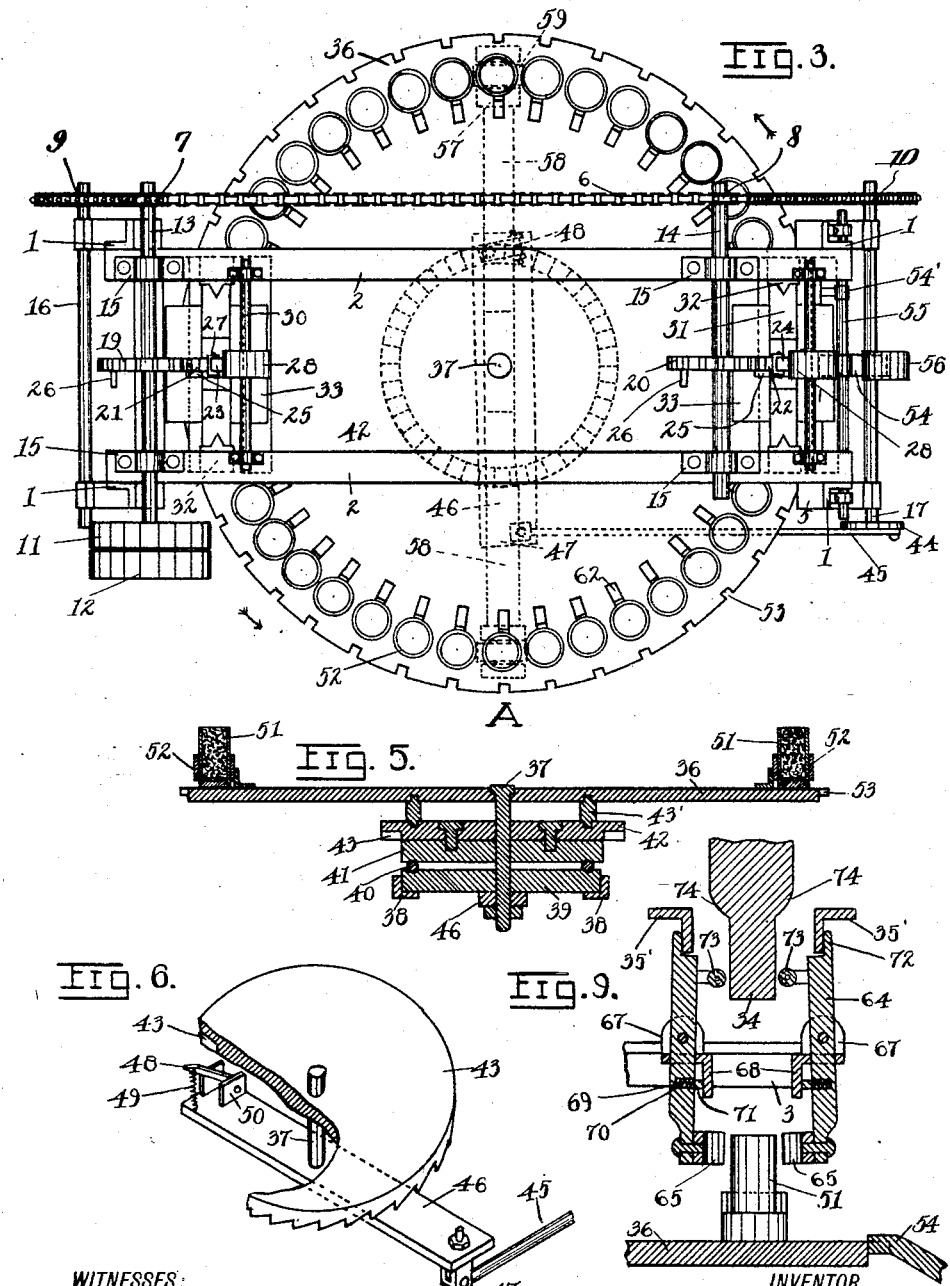

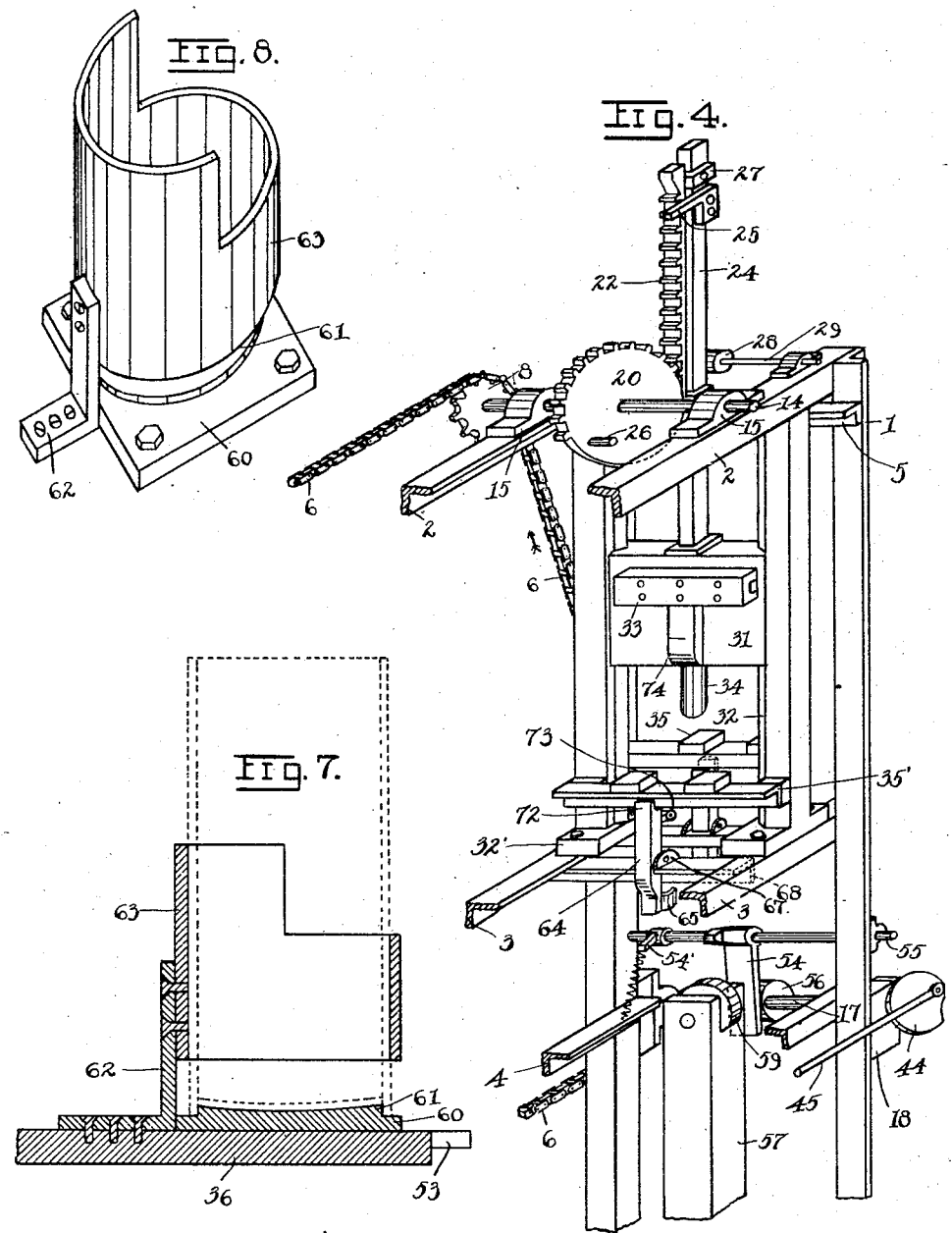

UNITED STATES PATENT OFFICE.

WALTER G. WAITT, OF FREMONT, OHIO, ASSIGNOR TO NATIONAL CARBON COMPANY, OF CLEVELAND, OHIO, A CORPORATION OF NEW JERSEY.

AUTOMATIC DRY-CELL HAMMER.

1,183,051. Specification of Letters Patent. Patented May 16, 1916.

Application filed June 19, 1913. Serial No. 774,584.

*To all whom it may concern:*

Be it known that I, WALTER G. WAITT, a citizen of the United States, residing at Fremont, in the county of Sandusky and State of Ohio, have invented a certain new and useful Improvement in Automatic Dry-Cell Hammers, of which the following is a full, clear, and exact description.

This invention relates to apparatus for delivering the final blow on dry cells before the seal is applied.

In the manufacture of dry batteries, a mix consisting principally of carbon, a depolarizer material such as pyrolusite, and electrolyte material, is packed in a paper-lined zinc container around a central carbon electrode. In order to obtain batteries of a uniform resistance and high amperage, it is necessary to have the mix densely packed, and it should be equally compacted in each cell. This requirement is substantially fulfilled by the initial tamping and filling process, but during subsequent handling, the mix is frequently jarred loose. Before sealing, the cells are usually hammered by a workman who delivers several blows on the top of the cell with a mallet and hollow punch fitting over the carbon electrode. It is impossible for the workman to deliver uniform blows on the cells and the amount which they are compacted by this final treatment varies considerably.

To obviate this difficulty, I have devised a rotary hammer to automatically deliver the final blows to the dry cell, before applying the seal which consists usually of several layers such as paper, sawdust, pitch, etc. The apparatus is adapted equally well for cells having a long lining, which extends over the top of the container, and is folded down around the electrode, or for short lined cells in which the lining reaches only a short distance above the top of the mix. In the latter type, a paper disk is sometimes placed over the mix before submitting to the final tamping and sealing operations.

In the drawings:—Figure 1 is a front view of the apparatus. Fig. 2 is an end view taken from the right of Fig. 1. Fig. 3 is a plan view. Fig. 4 is a perspective view of a part of the right hand side of the apparatus. Fig. 5 is a cross sectional view of the carrying plate and its supporting means. Fig. 6 is an isometric view of the plate feeding mechanism with certain parts removed. Fig. 7 is a vertical cross-section of one can holder and part of the supporting plate. Fig. 8 is a perspective view of the holder shown in Fig. 7. Fig. 9 is a cross-section of the apparatus for alining the cans.

Referring to Figs. 1, 2 and 3, a suitable frame-work for the tamper is built of angle irons riveted or bolted together in a convenient manner. Four upright angle irons 1, shown with their corners placed toward the center of the apparatus, are conveniently joined at the sides by the horizontal angles 2, 3 and 4, and at the ends by shorter angles 5. An endless chain 6 passes around four identical toothed wheels 7, 8, 9 and 10 and is propelled by a pulley 11 having the usual idler 12 in connection with it. Wheels 7 and 8 placed externally to the frame rotate respectively with the shafts 13 and 14 which are supported by bearings 15 fastened on the angles 2. Shafts 16 and 17 carry the wheels 9 and 10 and are supported by the bearings 18 fastened to the uprights 1. Two identical mutilated gears 19 and 20 are centrally mounted between the bearings 15 on the shafts 13 and 14, and operate racks 21 and 22. Both racks are located on the same side of their respective mutilated gears 19 and 20 and in the same relative position so that the racks are simultaneously raised. They are rigidly fastened by means of U shaped pieces 27 to the rectangular lifting rods 23, 24. Projecting arms 25 attached to these rods engage suitable projections 26 (Figs. 2 and 4) on the mutilated gears, best shown in Fig. 4, to cause the latter to properly mesh with the teeth of the racks. Guide wheels 28 may be supported on shafts 29 in the same manner as shafts 13 and 14, to keep the racks and gears in proper relation.

At the end of the rods 23 and 24, cross heads or plungers 30 and 31 are attached which move between guide ways 32 fastened between the members 2 and 3. The V shaped grooves and projections on the plunger and guides may be conveniently adjusted by means of bolts in the base 32'. The weight of the plungers may be altered when desired by means of additional weights 33 which may be conveniently bolted to the plunger. At the end of the plungers are attached hollow punches 34 and 34' of a suitable diameter to fit into the dry cell containers. Bumpers 35 may be fastened to angle irons 35' which are bolted on each side of the guide ways. The angles are spaced so as to engage the weights 33 and thus prevent the plunger from falling below a certain point.

The arrangement described constitutes the driving mechanism for reciprocating the plungers and the manner in which a table 36 on which the dry cells are attached is intermittently rotated will now be described.

The table 36 rotates about an axis 37 placed midway between the center of the punches 34 and 34'. As shown in cross section in Fig. 5, the table is supported by the frame upon angles 38 placed across the angles 4. A stationary steel plate 39 shown rectangular in form fits in the angles 38 and has a groove therein adapted to receive bearing balls 40. An upper plate 41 having a similar groove in its lower surface to receive the balls is placed above the plate 39 and bolted or otherwise fastened to a ratchet wheel 42. The diameter of this wheel is shown somewhat larger than that of the plate 41 and teeth 43 are cut in the lower surface near the outer edge. Table 36 is attached by means of spacers 43' to the ratchet wheel so that it is rotatable about the axis 37 upon the ball bearings.

The device for turning the table about the axis consists of a wheel 44 (Fig. 1) fitted on the end of the continuously rotating shaft 17 having a connecting rod 45 eccentrically fastened thereto, by means of a pin. A feeding arm 46 is mounted on the axis 37 as shown in Fig. 6 and is joined to the connecting rod 45 by means of a connection 47 to allow the rod to move in two planes at right angles to each other as will be understood from the drawings. At the other end of the arm a dog 48 is pivoted between suitable projections 50. A spring 49 keeps the dog in engagement with the teeth 43 and at each reciprocation of the connecting rod 45, the dog is moved so as to turn the ratchet and the connected table with its dry cells, through a space corresponding to the distance between two adjacent cells.

The dry cells 51, Fig. 5 are placed in holders 52 attached to the table 36 as will be described in detail later. A plurality of equi-distant holders are shown and the number of teeth on the ratchet 42 corresponds therewith so that each revolution of the driving pulley moves the cans forward the correct distance. The mutilated gear is so adjusted that the plunger drops during the period that the table is stationary. However, in order to keep the cans in alinement with the punch during this period, a number of notches 53 corresponding to the number of holders are cut in the edge of the table 36 so as to coöperate with a catch 54 actuated by a spring attached to the arm 54'. This catch is mounted on a shaft 55 in a position to engage the notches 53 successively. The catch is held in the notch by its spring during the stationary period of the table and released by means of a cam 56 rotating with the shaft 17. These parts are adjusted so as to release the catch just previous to the time when the plate is rotated, that is, while the plunger is being raised.

It is desirable to provide supports around the periphery of the plate, especially under the plungers. For this purpose, four uprights 57 having braces 58 are provided, two of which are placed directly below the plungers and the other two at 90 degrees therefrom. The wheels 59 are fastened in these supports for the plate to roll on. In this manner, the strain due to the impact of the falling plungers is borne by the supports.

A convenient manner of fastening the dry cell holders to the carrying plate is shown in Figs. 7 and 8. A plate 60 is bolted to the table and has a raised portion 61 adapted to fit into the slightly raised bottom of the zinc can as shown in Fig. 7 in dotted lines. An angular supporting member 62 is secured to the plate to hold a cylinder 63 which may be made of a short piece of iron pipe of a suitable diameter to receive the zinc can. The bottom of the cylinder is raised a short distance above the base 60 so as to avoid an accumulation of dirt. The outer edge of the upper surface of the cylinder 63 is cut away, as shown, to facilitate the placing of the cans in the holders.

The diameter of the punches 34 and 34', being almost as large as the containers thereunder, an alining means such as shown in Figs. 1, 2, and 9 is used to prevent the falling punch from damaging the edge of the zinc container whenever the alinement of these is imperfect. However, such alining means is not absolutely necessary and may be omitted if desired. This alining mechanism consists of a clutch formed by two pivoted arms 64 having members 65 attached to the lower end of it and adapted to grip the can. This gripping arrangement is preferably formed by two arcuate members, each being somewhat less than the arc of a semi-circle and of approximately the same radius as the container. The arms are pivoted between standards 67 supported by angle irons 68 bolted across the angles 3. The arms of the clutch are held out of engagement with the cans by the action of springs 69 which fit in the holes 70 in the arms. Small projecting pins 71 engage one end of the springs in the holes and the upper ends 72 of the arms engage the angle irons 35' to prevent further movement. At the upper end of the arms, wheels or projections 73 are attached which are moved by the cam surfaces 74 fastened on each side of the plungers so as to cause the clutch 65 to move inward and thus grip the container to hold it rigid and in position for the punch to enter without damaging the edge of the container.

Assuming the cells previously packed with the mix are placed in the holders successively at the point A, the operation is as follows: The driving pulley rotated in any manner turns the table 36 by means of the mechanism previously described, and the cans are fed in by workmen at point A, and carried around in the direction of the arrows in Fig. 3 until they finally come successively under the punch 34. Assuming now, the mutilated gears 19 and 20 and the racks 21 and 22 to be in position as shown in Figs. 1 and 4, in which the teeth of the mutilated gears have just ceased to mesh with the racks, the plunger 31 with the attached punch 34 delivers a blow on the mix in the can directly thereunder. While the plunger is falling, the mutilated gear will continue to rotate, but the smooth surface allows the plunger to drop freely between the guides 32. While the plunger is dropping, the spring actuated catch 54 holds the table stationary. As the cams 74 on the plungers pass the projections 73, the clutch will be moved to grip the container and adjust it so as to be directly in line with the punch 34. The same arrangement is used under the punch 34'. Soon after the plunger has delivered the blow to the cell beneath, the teeth on the gear 20 engage the rack and the plunger is raised back to the position shown in Fig. 1. During this time, the cam 56 removes the catch from the notch in the table and the latter is stepped around to bring another can in position to be compacted by the punch 34 when it again drops. The first mentioned container is finally stepped around until it comes under the second plunger 30 where it is again submitted to a further blow from the punch 34'. After it is stepped up from under the second plunger the workman removes it from the holder. In this way, the cans are successively passed under the two punches to receive two blows therefrom. One or more workmen by properly feeding and removing the cells keep the apparatus in continuous operation. Since difficulty might be encountered in meshing the racks 21 and 22 with the mutilated gears, the pins 26 projecting from the face of the gear and the projections 25 fastened to the lifting rod 24 are placed in such a relation that they engage each other just previous to the engagement of the gears and racks so as to cause them to mesh accurately. After moving a short distance farther, the teeth on the gears and racks are in position to assume the burden of lifting the plungers.

While I have shown two punches it is, of course within the scope of my invention to use more than this number or only one if desired.

The various parts are shown by way of example and it must be understood that equivalents can be substituted therefor.

Having described my invention, what I claim is:

1. In apparatus for hammering dry cells, a movable support for the cells, a movable hammer to deliver a blow on the dry cell contents and means for centering the can thereunder, said means being operated by the hammer in its working stroke.

2. In apparatus for hammering dry cells, a movable support, can holders adapted to loosely aline the cell cans, a movable hammer adapted to deliver a blow on the dry cell contents, and means for accurately alining the said cans when they have been moved to a position under said hammer.

3. In apparatus for hammering dry cells, a movable support for the cells, a reciprocating hammer for delivering a blow on the dry cell contents and a pair of oppositely disposed arms adapted to engage the cells to center them, said arms being operated by the hammer on its working stroke.

4. In apparatus for hammering dry cells, a rotating table having holders for the cells, said holders making a loose fit therewith, means for intermittently rotating the table, means for locking the table against movement when the said moving means is inactive, a reciprocating hammer, means for raising the hammer and for releasing it to deliver a blow on the cell thereunder, and a centering device to center the can in the loose fitting holder when under the hammer.

5. In apparatus for hammering dry cells, a movable support adapted to carry said dry cells, a reciprocating hammer adapted to deliver a blow to the contents of said cells when they are moved thereunder, pivoted arms on opposite sides of the said hammer, projections on each of said arms, and cams on the hammer adapted to engage said projections to swing the arms to engage the cells as the hammer moves toward the said cells.

6. In apparatus for hammering dry cells, a movable table for the cells and a holder attached thereto having a space between the table and holder.

7. In an apparatus for hammering dry cells, a movable table for the cells and a holder attached thereto having a bottom engaging member and a member for engaging the cylindrical portion of the cell, said members being spaced apart.

In testimony whereof, I hereunto affix my signature.

WALTER G. WAITT.

Witnesses:
 LESTER WILSON,
 AGNES ROSE GABEL.

Copies of this patent may be obtained for five cents each, by addressing the "Commissioner of Patents, Washington, D. C."